US008523218B2

(12) United States Patent
Doucette et al.

(10) Patent No.: US 8,523,218 B2
(45) Date of Patent: Sep. 3, 2013

(54) STROLLER WITH ARTICULATING STRUCTURE

(75) Inventors: Louis Doucette, Acworth, GA (US);
Thomas Perrin, Downingtown, PA (US); Matthew Ransil, Richland, PA (US); Todd Sorzano, Alpharetta, GA (US); Brady M. Schroeder, Milton, GA (US)

(73) Assignee: Europe Brands S.a.r.l., Luxembourg (LU)

( * ) Notice: Subject to any disclaimer, the term of this patent is extended or adjusted under 35 U.S.C. 154(b) by 382 days.

(21) Appl. No.: 12/853,272

(22) Filed: Aug. 9, 2010

(65) Prior Publication Data
US 2012/0032418 A1   Feb. 9, 2012

(51) Int. Cl.
*B62B 7/00*   (2006.01)

(52) U.S. Cl.
USPC .......................................... 280/642; 280/47.4

(58) Field of Classification Search
USPC ..... 280/642, 647–650, 657, 658, 47.38–47.4, 280/79.2, 47.25
See application file for complete search history.

(56) References Cited

U.S. PATENT DOCUMENTS

| | | | |
|---|---|---|---|
| 6,412,809 B1 * | 7/2002 | Bigo et al. | 280/642 |
| 6,513,827 B1 | 2/2003 | Barenbrug | |
| 7,066,542 B2 | 6/2006 | Wang | |
| 7,377,537 B2 | 5/2008 | Li | |
| 7,694,996 B2 * | 4/2010 | Saville et al. | 280/642 |
| 7,717,456 B2 * | 5/2010 | Chen et al. | 280/642 |
| 7,871,100 B2 * | 1/2011 | Chen et al. | 280/642 |
| 8,186,705 B2 * | 5/2012 | Greger et al. | 280/643 |
| 2010/0117315 A1 | 5/2010 | Yu et al. | |
| 2010/0237591 A1 * | 9/2010 | Hartenstine et al. | 280/650 |
| 2010/0244408 A1 * | 9/2010 | Dean et al. | 280/647 |
| 2010/0308552 A1 * | 12/2010 | Mival et al. | 280/47.4 |
| 2010/0314855 A1 * | 12/2010 | Mival et al. | 280/650 |

FOREIGN PATENT DOCUMENTS

| | | |
|---|---|---|
| DE | 100 11 588 | 1/2001 |
| DE | 10 2004 022 843 | 12/2004 |
| DE | 20 2004 018 180 | 2/2005 |
| EP | 567 422 | 10/1993 |
| EP | 519 857 | 1/1995 |
| EP | 1 366 987 | 12/2003 |
| GB | 2 282 322 | 5/1995 |
| GB | 2 446 236 | 8/2008 |
| WO | WO 93/07039 | 4/1993 |
| WO | WO 2007/053021 | 5/2007 |
| WO | WO 2009/077787 | 6/2009 |
| WO | WO 2009/077788 | 6/2009 |
| WO | WO 2009077787 A2 * | 6/2009 |

* cited by examiner

*Primary Examiner* — Katy M Ebner
(74) *Attorney, Agent, or Firm* — Lempia Summerfield Katz LLC

(57) ABSTRACT

A stroller has a seat assembly with a seat bottom and a seat back that is movable from an upright in-use orientation to a forward folded orientation closer to the seat bottom. A structure such as an arm bar extends across the seat assembly above the seat bottom and in front of the seat back. The structure is in a raised in-use position with the seat back in the in-use orientation. The structure moves from the in-use position to a lowered stowed position closer to the seat bottom when the seat back is moved to the folded forward orientation.

20 Claims, 5 Drawing Sheets

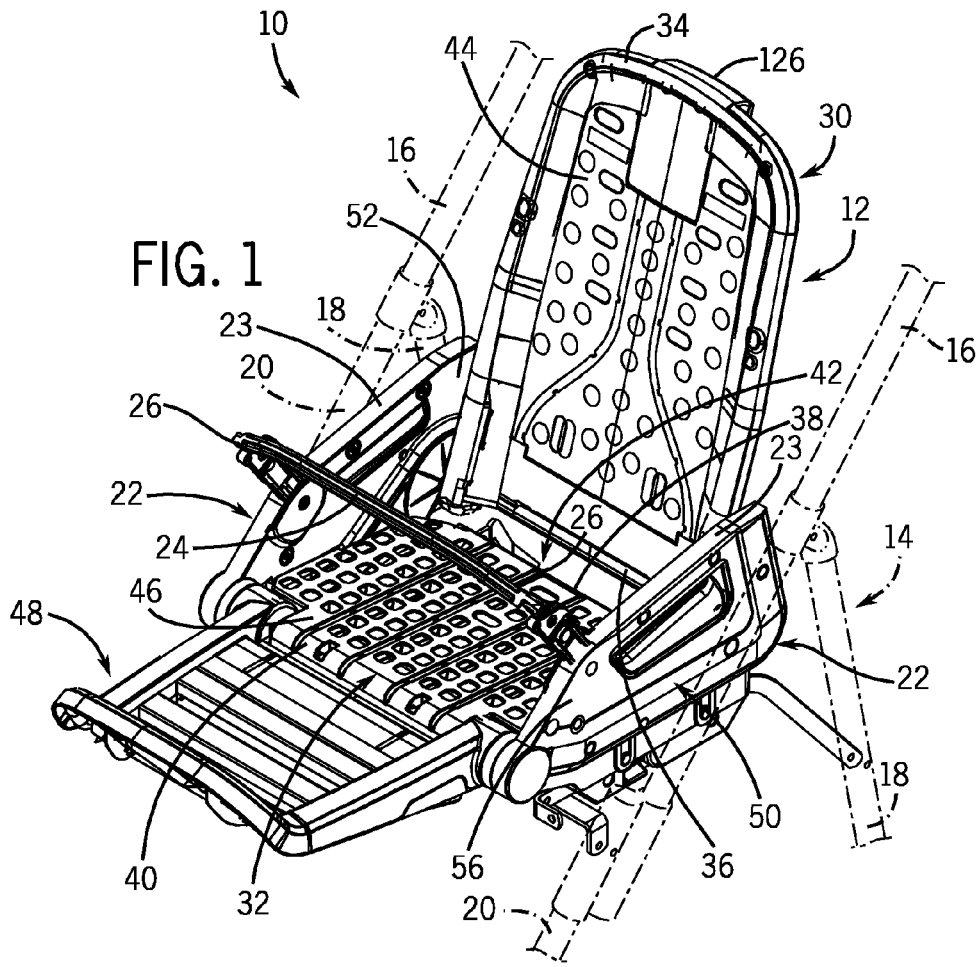
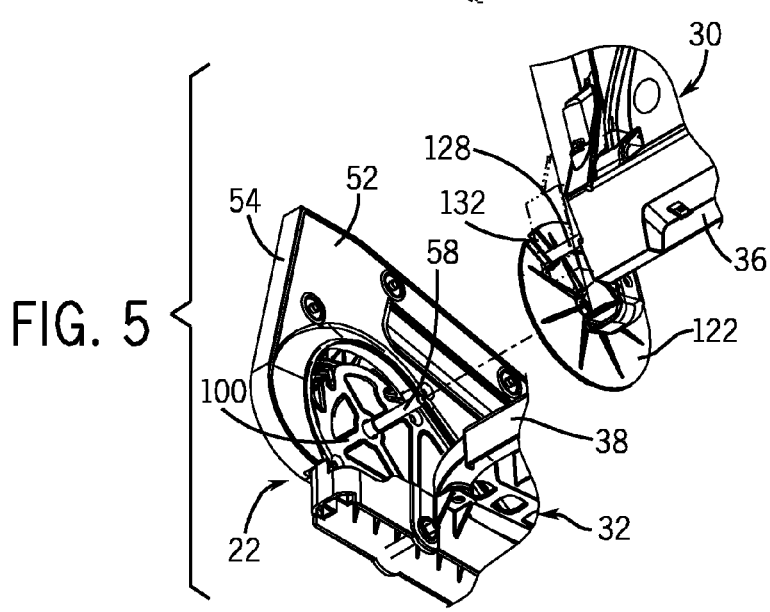

STROLLER WITH ARTICULATING STRUCTURE

BACKGROUND

1. Field of the Disclosure

The present invention is generally directed to strollers and stroller seats, and more particularly to a stroller seat with an adjustable calf support.

2. Description of Related Art

Foldable strollers are known in the art. A foldable stroller can be reconfigured from a set up or in-use configuration to a compact, folded configuration. The folded configuration renders the stroller more compact than the in-use configuration for easier transport and storage when not in use. Some strollers have an arm bar, a child tray, or other type of structure that traverses or extends across the toddler seat on the stroller. The structure is typically positioned above the seat bottom and forward of the seat back to allow a child to sit in the seat with the structure in place.

The positioning of the structure, such as an arm bar or a child's tray, can inhibit the degree to which the stroller can be folded. In particular, sometimes the seat back of the toddler seat folds forward and downward toward the seat bottom. However, the seat back can only fold forward until it comes into contact with the arm bar or tray. This typically will significantly limit the degree to which the seat assembly, and thus the stroller, can be folded. In particular, the stroller often would not be capable of folding very flat, were the traversing structure, arm bar, or tray be left in place.

In order to alleviate this problem, most strollers are designed so that the arm bar, child's tray, or other traversing structure is removable. When a caregiver wishes to fold the stroller, the arm bar or tray is first removed. This allows the stroller to be folded to a compact configuration. However, removal of the structure requires the caregiver to perform the additional step of manual removal of the structure prior to folding the stroller. Also, the arm bar, child's tray, or other structure must then be separately transported and stored, independent of the folded stroller. This can result in the arm bar or tray being left behind, lost, misplaced, or the like. In addition, when the stroller is unfolded for use, the caregiver must locate and manually replace the arm bar, tray, or structure on the stroller or it will not be available for use. This again requires an additional manual step prior to the stroller being ready for use.

Some strollers are provided as a modular product with a seat assembly and a stroller frame as separate units. The seat assembly can be installed on the frame for use and removed from the frame for storage, for transporting the stroller when not in use, or for replacing either the seat or the frame. Some of these types of seats can be folded in a similar manner as described above. Thus, any structure on the seat assembly would still have to be removed to compactly fold the seat, or the structure would inhibit compact folding of the seat assembly. Also, the seat back on these types of seats may be capable of folding. However, the seat back is typically not locked in the folded orientation. This can make it cumbersome to carry the folded seat assembly because the seat back may not stay folded.

SUMMARY

In one example according to the teachings of the present invention, a stroller has a seat assembly with a seat bottom and a seat back that is movable from an upright in-use orientation to a forward folded orientation closer to the seat bottom. The stroller has a structure that extends across the seat assembly above the seat bottom and in front of the seat back. The structure is in a raised in-use position with the seat back in the in-use orientation. The structure moves from the in-use position to a lowered stowed position closer to the seat bottom when the seat back is moved to the folded forward orientation.

In one example, the stroller can have a frame movable from an in-use configuration to a folded configuration. The seat back can be movable between the in-use and folded forward orientations with the frame in the in-use configuration.

In one example, the seat back can be reclined rearward from the upright in-use orientation to a fully reclined orientation. The structure can remain in the in-use position with the seat back in the fully reclined orientation.

In one example, the seat back can be reclined to an intermediate reclined orientation between the upright in-use orientation and a fully reclined orientation. The structure can remain in the in-use position with the seat back in the intermediate orientation.

In one example, the stroller can have an armrest support on each side of the seat assembly. Each armrest support can house an articulating mechanism that articulate the structure from the in-use to the stowed position.

In one example, the structure can be an arm bar, a tray for the seat occupant, or the like.

In one example, the structure can be coupled to the seat back by a drive link that can translate as the seat back moves between the upright in-use and folded forward orientations.

In one example, the seat back can pivot about a pivot shaft and wherein the drive link has an elongate slot through which the pivot shaft passes.

In one example, the seat back can have a drive cam fixed to the lower end at each side of the seat back for rotation with the seat back. The drive cam can have a curved drive slot.

In one example, the seat back can pivot on a pair of pivot shafts. The pivot shafts can each protrude from an armrest support on each side of the seat assembly. A drive cam can be provided on each side of the lower end of the seat back and each can have a drive slot. Each drive slot can be arranged radially outward from an axis of the respective pivot shaft.

In one example, a drive cam can be provided on each side of the lower end of the seat back and each can have a drive slot. Each drive slot can be arranged such that the radial distance from a seat back pivot axis is constant from one end to a mid-portion of the drive slot and such that the radial distance from the axis varies from the other end to the mid-portion of the drive slot.

In one example, a drive link can be connected at one end to a cam slot in a drive cam on each side of the lower end of the seat back and at the other end to the structure.

In one example, the stroller can include an armrest support on each side of the seat assembly, a recline stud projecting from the lower end of each side of the seat back, a pivot shaft on each of the armrest supports about which the seat back pivots, and a positioning plate carried on each of the armrest supports. Each positioning plate can define a plurality of recline notches arranged radially spaced from and around the respective pivot shaft. The plurality of recline notches can include an upright position notch and a folded position notch. The recline studs can seat in the respective upright position notches with the seat back in the upright in-use position and in the respective folded position notches with the seat back in the folded orientation.

In one example, the stroller can include a lock guard positioned between each side of the seat back and a recline positioning plate. The lock guard can cover a plurality of recline notches in the plate and can have a stud slot through which a seat positioning recline stud can pass. The lock guard can also pivot with movement of the seat back.

In one example, the seat back can be locked in the folded orientation, whereby an actuator must be actuated to release the seat back from the folded orientation.

In one example, the seat assembly can be removable from a frame of the stroller. The seat assembly can include the seat back, seat bottom, and structure.

In one example according to the teachings of the present invention, a stroller has a seat bottom with a generally upward facing seat surface and a seat back with a back support surface. The seat back can be pivotable forward from a generally upright in-use orientation to a stowed orientation with the back support surface facing toward the seat surface. An armrest support can be positioned on each side of the seat bottom. A structure, such as an arm bar or child's tray, can have an end coupled to each of the armrest supports and extend across the seat assembly above the seat bottom and in front of the seat back. The structure is in a raised in-use position with the seat back in the in-use orientation. The structure moves toward the seat bottom from the in-use position to a lowered stowed position when the seat back is moved to the stowed orientation.

In one example, the structure is an arm bar with a pair of opposed ends pivotally connected to one of the armrest supports.

In one example, the structure can have a pair of opposed ends. Each end can be connected to an articulating link pivotally coupled to one of the armrest supports.

In one example, the structure has a pair of opposed ends, each connected to an articulating link pivotally coupled to one of the armrest supports. Each articulating link can be coupled to one end of a drive link. Each drive link can have an opposite end connected to a drive cam rotationally fixed to each side of the seat back.

In one example, a drive cam can be rotationally fixed to each side of the seat back. Each drive cam can have a cam slot that translates a respective drive link to move the structure when the seat back is moved between the upright in-use orientation and the stowed orientation.

In one example, the seat back can be moved rearward from the upright in-use orientation to a reclined orientation. A cam slot in a drive cam on each side of the seat back can be configured to not translate a respective drive link so as to not move the structure when the seat back is moved between the upright in-use orientation and the reclined orientation.

BRIEF DESCRIPTION OF THE DRAWINGS

Objects, features, and advantages of the present invention will become apparent upon reading the following description in conjunction with the drawing figures, in which:

FIG. 1 shows s perspective view of one example of a stroller and seat assembly with an articulating arm bar constructed in accordance with the teachings of the present invention.

FIG. 5 shows a perspective, partial exploded view of one of the seat pivot joints and a lock guard of the seat assembly shown in FIG. 1.

DETAILED DESCRIPTION OF THE DISCLOSURE

Figure 2:
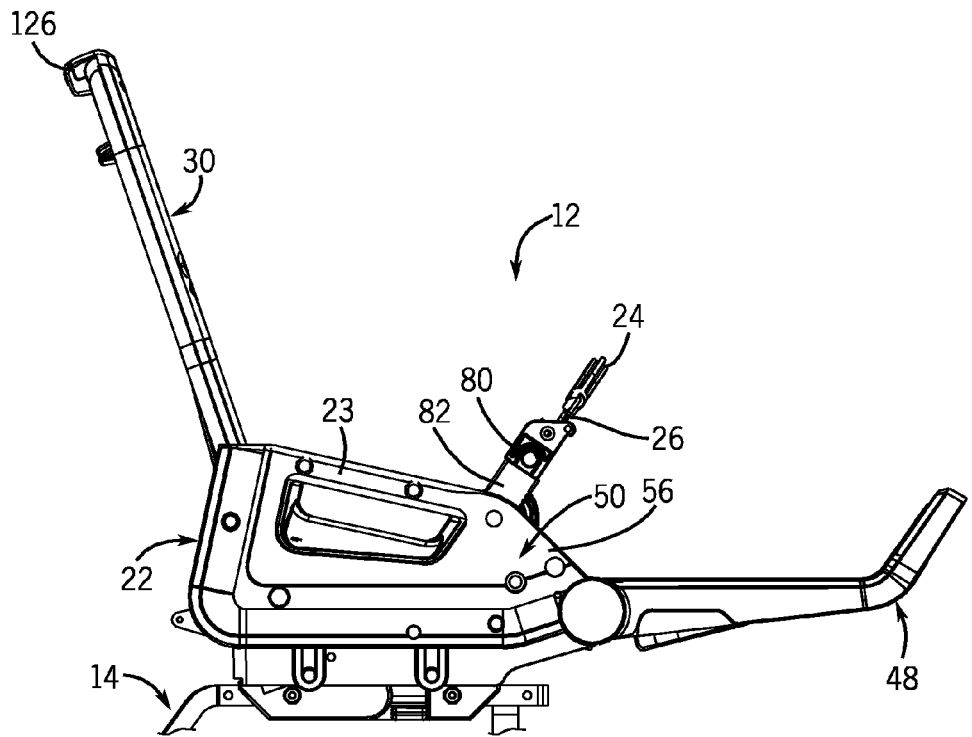
FIG. 2 shows a right side view of the seat assembly in FIG. 1 with the seat back in an upright, in-use orientation and the arm bar in an in-use position.

The disclosed stroller solves or improves upon one or more of the above-noted and/or other problems and disadvantages with prior known strollers. In one example, the disclosed stroller has an arm bar, child's tray, or other transverse structure extending or traversing across the seat assembly. The structure as disclosed herein need not be removed from the seat assembly or frame prior to folding the stroller. In one example, the disclosed stroller and seat assembly can be folded to a compact configuration with the structure still in place. In one example, the structure is in an in-use position across the toddler seat with the seat back of the seat assembly in an upright, in-use orientation. In one example, the structure is in the in-use position with the seat back in any one of a plurality of reclined in-use orientations. In one example, the structure articulates to a stowed position from the in-use position as the seat assembly is folded to a compact configuration. In one example, the structure moves to the stowed position when the seat back is pivoted forward and downward from the in-use orientation to a folded orientation. In the disclosed example, the traversing structure in the stowed position allows the seat back to fold further than if the structure were to have remained in the in-use position. These and other objects, features, and advantages of the present invention will become apparent to those having ordinary skill in the art upon rereading this disclosure.

Turning now to the drawings, FIG. 1 shows a one example of a stroller 10 and a stroller seat assembly 12 constructed in accordance with the teachings of the present invention. In this example, the stroller 10 is depicted in generic form having a frame 14 shown in dashed line or phantom view. The frame 14 generally has a pair of push bars 16 that extend upward and rearward of the seat assembly 12 to form the stroller handle (not shown) behind and above the seat assembly. The frame 14 also has rear legs 18 and front legs 20, which are also generically represented. Each of the rear legs 18 and front legs 20 would typically carry one or more stroller wheels (not shown) on which the frame 14 would rest and roll during use.

In this example, the stroller 10 includes a pair of armrest supports 22 positioned on opposite sides of the frame 14. The seat assembly 12 positioned between the armrest supports 22, which can be mounted to or be a part of either the seat assembly or the frame 14. Each armrest support 22 defines an armrest 23 at a top of the support. A structure, such as an arm bar 24 or a child's tray (not shown) traverses the frame 14 and extends across the seat assembly 12, as is known in the art. The structure is described herein as the arm bar 24 throughout the description. However, it should be understood that the structure can be a child's tray or other type of structure. The arm bar 24 has a pair of opposite or opposed ends 26 that are connected to the armrest supports 22.

Other components of the stroller 10, such as the front and rear wheels, seat mounting and support parts, ancillary frame and fold joint components, parent trays, cup holders, canopies, storage baskets, handles, and the like are not described or depicted herein. However, the stroller 10 can comprise a wide variety of different features, parts, components, and accessories and yet fall within the spirit and scope of the present invention. As will be evident to those having ordinary skill in the art, the overall design and construction of the stroller 10 on which the seat assembly 12 is deployed can vary considerably from the example disclosed and described herein.

Also as shown in FIG. 1, the seat assembly 12 is illustrated with no soft goods applied to the seat assembly 12 or the frame 14. Instead, the seat assembly and related components can be clearly seen, as they are not hidden or covered by soft goods or other stroller components. In general, the disclosed seat assembly 12 has a seat back 30 and a seat bottom 32. The seat back 30 in this example has an upper end 34 and a lower end 36 as is known in the art. Similarly, the seat bottom 32 has a rear end 38 and a forward end 40 also as is known in the art. The lower end 36 of the seat back 30 and the rear end 38 of the seat bottom 32 are located closely adjacent to one another at a seat bight region 42. With the stroller 10 in an in-use configuration of FIG. 1, the seat back 30 generally has a back support surface 44 on its front or forward facing side. The seat bottom 32 generally has a seat surface 46 on its top or upward facing side when the stroller 10 is in an in-use configuration. In the example, the seat assembly 12 has an optional calf support 48. The calf support 48 is pivotally connected to the forward end 40 of the seat bottom and to the front ends of the armrest supports 22.

As with the overall stroller 10, the configuration and construction of the basic components of the seat assembly 12 can vary considerably and yet fall within the spirit and scope of the present invention. In one example, the frame 14 can be a modular chassis and the seat assembly 12 can be a removable, replaceable module for the chassis. In the disclosed example, the seat assembly 12 includes the armrest supports 22, seat bottom 32, seat back 30, and structure 24 as a modular unit independent of the frame 14. Thus, the seat assembly 12 can be removed and stowed, stored, or transported separate from the frame 14.

In accordance with the teachings of the present invention, the seat back 30 in this example can be moved between at least two orientations. The seat back 30 can be moved between at least the upright, in-use orientation noted above and depicted in FIGS. 1 and 2 and a folded or stowed orientation depicted in FIG. 3. In the folded orientation, the back support surface 44 is generally facing downward toward the seat surface 46 of the seat bottom 32. In this example, since the seat assembly 12 is a modular unit independent of the frame 14, the seat back can be reoriented in a number of ways. The seat back 30 can be moved to the folded orientation with the seat mounted to the frame and with the frame in the in use configuration. The seat back can also be folded before or after the seat assembly 12 is removed from the frame 14.

Figure 3:
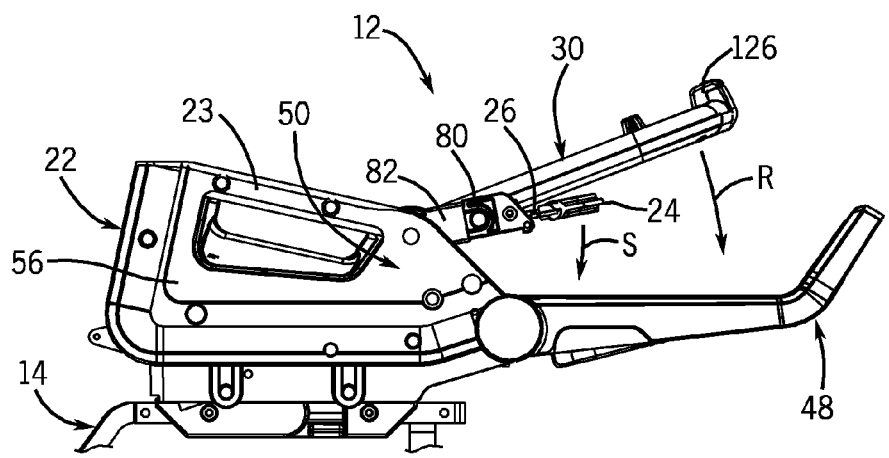
FIG. 3 shows the seat assembly in FIG. 2 but with the seat back in a folded orientation and the arm bar in a stowed position.

As shown in FIG. 2, the arm bar 24 is positioned in the deployed or in-use position. In this position, the arm bar 24 is directed more vertically upward than forward and is spaced well above the seat surface 46 of the seat bottom 32. As noted above with respect to prior art stroller seats, if the seat back 30 were to fold with the arm bar 24 in the in-use position, the arm bar would block the seat back from folding further downward toward the seat bottom. Thus, the arm bar 24 in the in-use position would significantly inhibit a more compact folded seat structure. However, the seat assembly 12 in the disclosed example is configured so that the arm bar 24 articulates forward and downward to a stowed position when the seat back 30 is folded. The arm bar 24 in the stowed position is shown in FIG. 3. In the stowed position, the arm bar 24 is significantly lower and closer to the seat bottom 32 in the stowed position in comparison to the in-use position depicted in FIG. 2.

Figure 4:
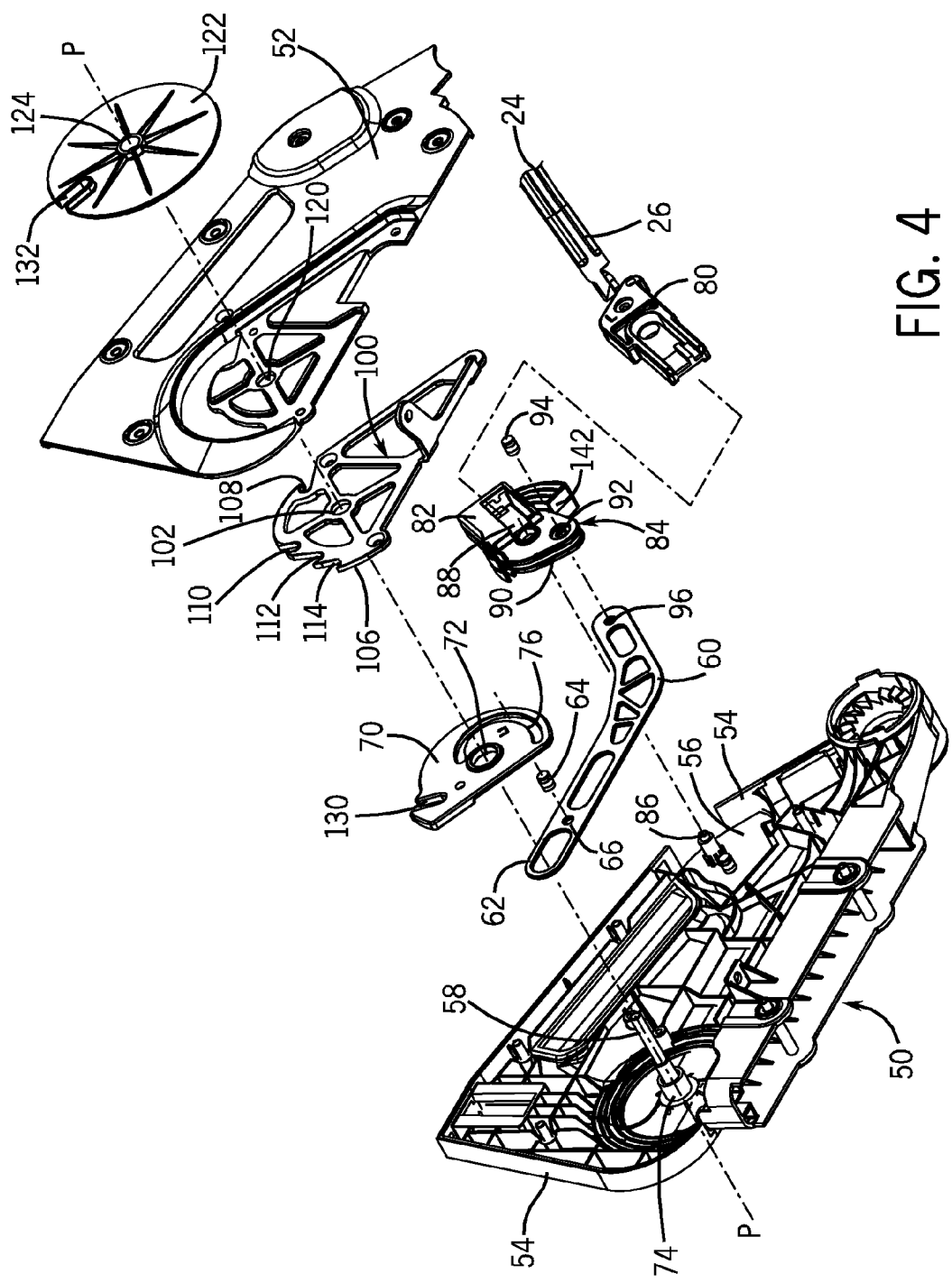
FIG. 4 shows an exploded view of a portion of the seat assembly and arm bar of FIG. 1.

In the disclosed example, the seat back 30 is linked to the arm bar 24 by an articulating mechanism that is housed substantially within each of the armrest supports 22. FIG. 4 shows an exploded view of the left side armrest support 22 from an inside perspective. The components of the articulating mechanism within the left side armrest support 22 are described herein. The right side armrest support 22 and articulating mechanism in the disclosed example is of an identical construction and is a minor image of the left side armrest support and mechanism. Thus, only the left side armrest support components are discussed in detail. However, the description is equally applicable to the right side armrest support and mechanism.

As shown in FIG. 4, the armrest support 22 has an outer housing 50 and an inner cover panel 52 that is received over and covers an exposed interior cavity of the outer housing 50. The outer housing 50 has a perimeter wall 54 that extends circumferentially around an outer panel 56 of the housing 50 and inward toward the seat assembly 12. The wall 54 and the outer panel 56 form the shallow cavity within the outer housing 50. The inner cover panel 52 can be secured to the outer housing 50 over the open side of the cavity to close off the cavity. A number of components of the articulating mechanism are housed within the interior cavity of the armrest support 22.

A seat pivot shaft 58 projects in an inward direction from the outer panel 56. The seat pivot shaft 58 defines a pivot axis P about which the seat back 30 pivots when moved from the in-use upright orientation to the folded orientation. An elongate drive link 60 has an oblong slot 62 in one end. The pivot shaft 58 is captured within the link slot 62. A drive pin 64 is connected to the one end of the drive link 60 adjacent the slot 62, but further from the one end. The drive pin 64 is secured to the drive link 60 within a pin opening 66.

A drive cam 70 has a somewhat disc-shaped body with a central opening 72 through which the pivot shaft 58 is received. As shown in FIG. 4, the pivot shaft 58 has a large diameter sleeve or bearing section 74 directly adjacent the inner surface of the outer panel 56. Both the width of the link slot 62 and the diameter of the central opening 72 on the drive cam 70 are sized to closely fit the diameter of the sleeve or bearing section 74. The drive cam 70 has a drive slot 76 formed through the body of the cam. The drive pin 64 of the link 60 seats in and can slide along the drive slot 76 as described below in greater detail. The drive slot 76 is curved around and spaced from the central opening 72. The radial distance of the drive slot 76 relative to the axis of the central opening 72 varies from one end of the slot to the other as also described in greater detail below.

A female connector 80 is attached to the end 26 of the arm bar 24. The female connector 80 is connected to a male receiver 82 carried on an articulating link 84. The female connector 80, male receiver 82, and articulating link 84 form a rigid extension on the end 26 of the arm bar 24. The articulating link 84 can be fixed to the end 26 of the arm bar 24 in this example by snapping the female connector 80 into the male receiver 82. A link post 86 projects inward from the inner surface of the outer panel 56. In this example, the pivot shaft 58 is positioned near a rear end of the armrest support 22. The link post 86 is positioned closer to a forward end of the armrest support 22 spaced from the pivot shaft 58. A pivot opening 88 is formed through the articulating link 84 and the link post 86 is received through the opening such that the articulating link can rotate about the post. The articulating link 84 has a short connector arm 90 with a connector opening 92 near its distal end. A connector pin 94 is received through the connector opening 92 and connects to the opposite forward end of the drive link 60 at a pin opening 96.

A positioning plate 100 has a shaft opening 102 through one end and the pivot shaft 58 is received through the shaft opening. A plurality of seat positioning notches is formed in an edge 106 of the plate 100. In this example, the plurality of notches includes at least a fold notch 108 and an upright, in-use notch 110 formed in the edge of the plate. These notches 108 and 110 coincide, respectively, with the folded and in-use, upright seat back orientations. The plate 100 in this example also includes two additional, in-use, seat recline notches including an intermediate recline notch 112 and a full recline notch 114. The purpose and function of these additional notches is described below.

The inner cover panel 52 of the armrest support 22 also has a shaft opening 120 through which the pivot shaft 58 also passes. When assembled, the one end of the drive link 60, the drive cam 70, and the one end of the plate 100 are stacked on the pivot shaft 58 and sandwiched between the outer housing 50 and inner cover panel 52. A lock guard 122 is positioned on the interior side of the inner cover panel 52. The lock guard has a center opening 124 that is also received over the pivot shaft 58. The purpose of the lock guard 122 is also described below.

As shown in FIG. 1, a recline actuator 126 is positioned at the upper end 34 on the seat back 30. As shown in FIG. 5, the lower end 36 of the seat back 30 is pivotally coupled to the pivot shaft 58. The seat back 30 pivots about the pivot shaft 58 when changing or adjusting the orientation of the seat back. Also as shown in FIG. 5, a recline stud 128 projects outward from the side of the seat back 30 adjacent the lower end 36. Though not shown herein, the recline stud 128 is coupled to the recline actuator 126 by a wire, cable, or the like. Actuating the recline actuator 126 will lift the recline stud 128 upward away from the lower end 36 of the seat back 30.

With reference to FIG. 4, a travel slot 130 is formed in an edge of the drive cam 70. Likewise, a stud slot 132 is formed in an edge of the lock guard 122. The recline stud 128 seats within each of the travel slot 130 and stud slot 132. The slots 130 and 132 are long enough to allow for the travel distance of the recline stud 128 when the recline actuator 126 is actuated and yet for the stud to remain captured within the slots. The slots 130 and 132 thus act in conjunction with the recline stud 128 as a key to rotationally fix the lock guard 122 and drive cam 72 with the seat back 30.

Figure 6:
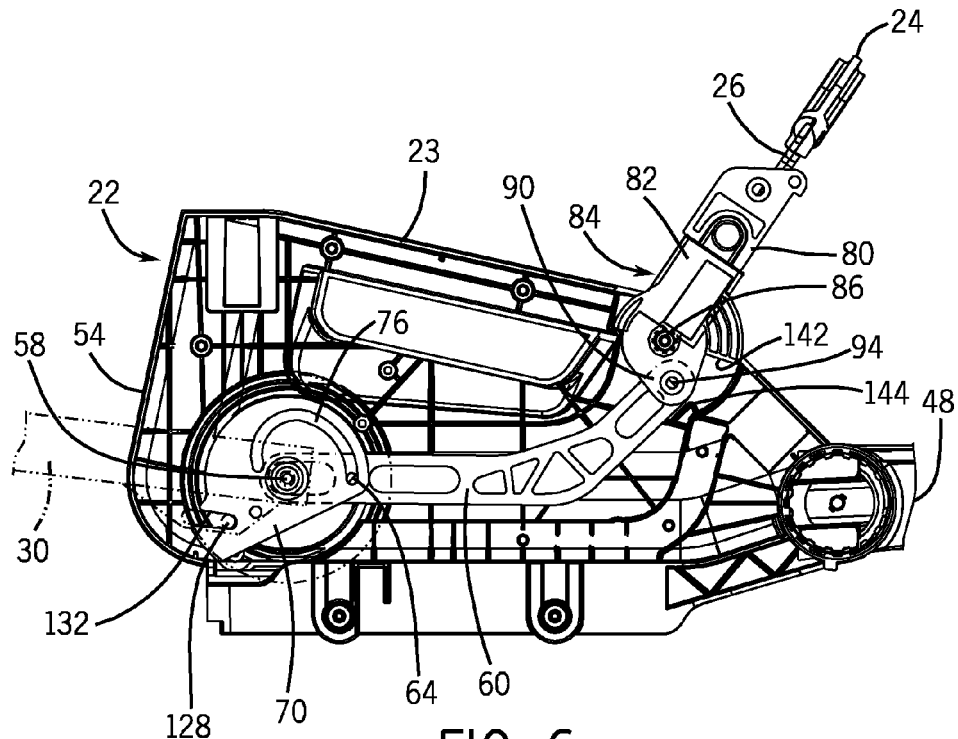
FIG. 6 shows a cut-away view of part of the seat assembly in FIG. 2 with the seat back in the upright in-use orientation and the arm bar in the in-use position.

FIGS. 6-9 show an inside view of the left side armrest support 22 with the inner cover panel 52 removed and with the articulating mechanism assembled. In FIG. 6, the arm bar 24 is in the in-use position and the seat back 30 is in a fully reclined position. In this position, the recline stud 128 is seated in the full recline notch 114 of the seat positioning plate 100. In this configuration, the drive link 60 is in a forward-most position. The pivot shaft 58 is seated within the link slot 62 against the rear-most end of the slot. Also, the drive pin 64 is seated at the lowermost end of the drive slot 76 in the drive cam 70. As can be seen in this figure, the lower majority of the drive slot 76 has a consistent curvature and a generally constant radial distance from the pivot axis P of the shaft 58. Also, with the drive link 60 in the forward-most position, the drive link biases the arm bar 24 to the in-use position. The drive link 60 does so by its connection to the connector arm 90. The position of the drive link 60 dictates the orientation of the connector arm 90 on the articulating link 84. In this link position, the connector arm is rotated forward, which positions the arm bar 24 in the raised position.

Figure 7:
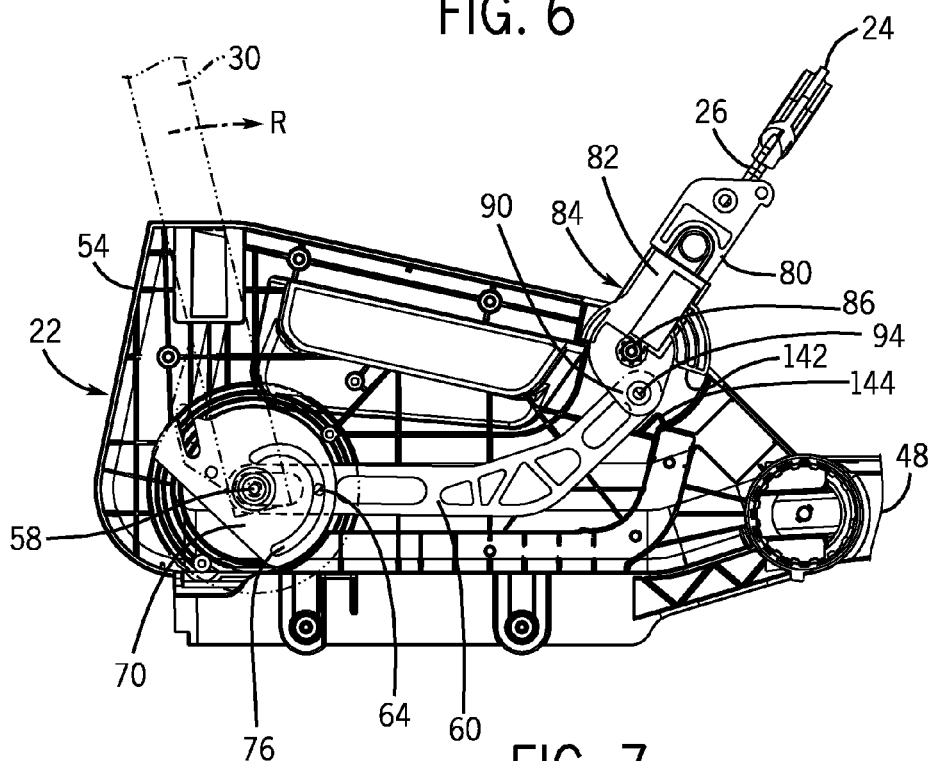
FIG. 7 shows the seat assembly in FIG. 6 but with the seat back in a fully reclined in-use position and the arm bar in the in-use position.

The seat back 30 can be raised from the fully recline orientation of FIG. 6 to an intermediate recline orientation (not shown), wherein the recline stud 128 would seat in the intermediate notch 112. The seat back 30 can also be raised to the fully upright orientation as shown in FIGS. 2 and 7 by pivoting the seat back upward in the direction of the arrow R. As illustrated, the drive cam 70 pivots with the seat back 30. In doing so, the relative positioning of the drive slot 76 changes with respect to the drive pin 64. However, because the drive pin is still within the lower portion of the drive slot 76, which has a relatively constant radial distance from the pivot axis P, the drive pin 64 and the link 60 remains stationary. As a result, the articulating link 84 and thus the arm bar 24 also remain stationary. The articulating mechanism permits the seat back 30 to be re-oriented between the upright orientation (see FIG. 7) and any one of a plurality of recline orientations including the fully reclined orientation (see FIG. 6) without affecting the position of the arm bar 24.

Figure 8:
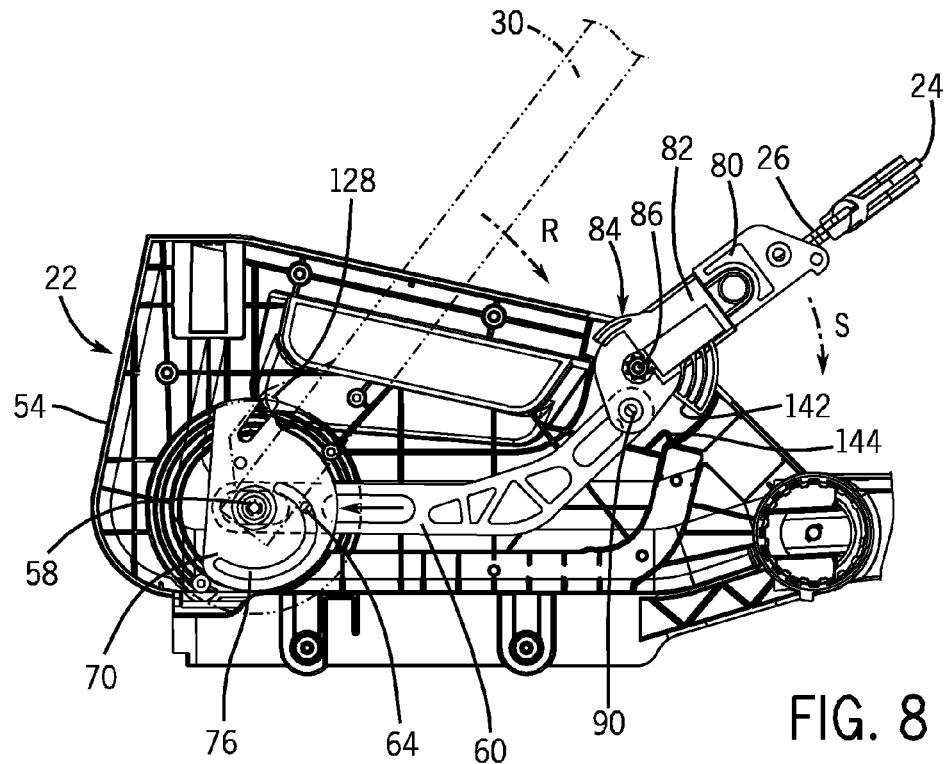
FIG. 8 shows the seat assembly in FIG. 6 but with the seat back in a partly folded orientation and the arm bar in a transitional stowed position.

However, movement of the seat back 30 from the upright in-use orientation toward the folded orientation will begin to articulate the arm bar 24 toward the stowed position. As shown in FIG. 8, movement of the seat back 30 in the direction of the arrow R begins to drive the articulating mechanism rearward. The upper portion of the drive slot 76 gradually becomes closer to the pivot axis P, i.e., the radial distance of the drive slot decreases moving closer to the upper end of the slot. As the seat back 30 is folded forward, the drive cam 70 continues to rotate about the pivot shaft 58. This causes the drive pin 64 to slide relative to the drive slot 76 closer to the upper end of the slot. The drive pin 64 is fixed to the drive link 64. The slot 76 draws the drive pin 64 rearward toward the pivot shaft 58. In turn, the pin 64 draws the drive link 60 rearward in the direction of the arrows on the link 60 in FIGS. 8 and 9. Rearward motion of the drive link 60 pulls the connector arm 90 of the articulating link 85 in a rearward direction. Movement of the drive link 60 begins to rotate the articulating link 84 about the link post 86 in the direction of the arrow S. Since the arm bar 24 is fixed to the articulating link 84, the arm bar 24 also begins to rotate in concert with the articulating link 84 downward in the direction of the arrow S.

Figure 9:
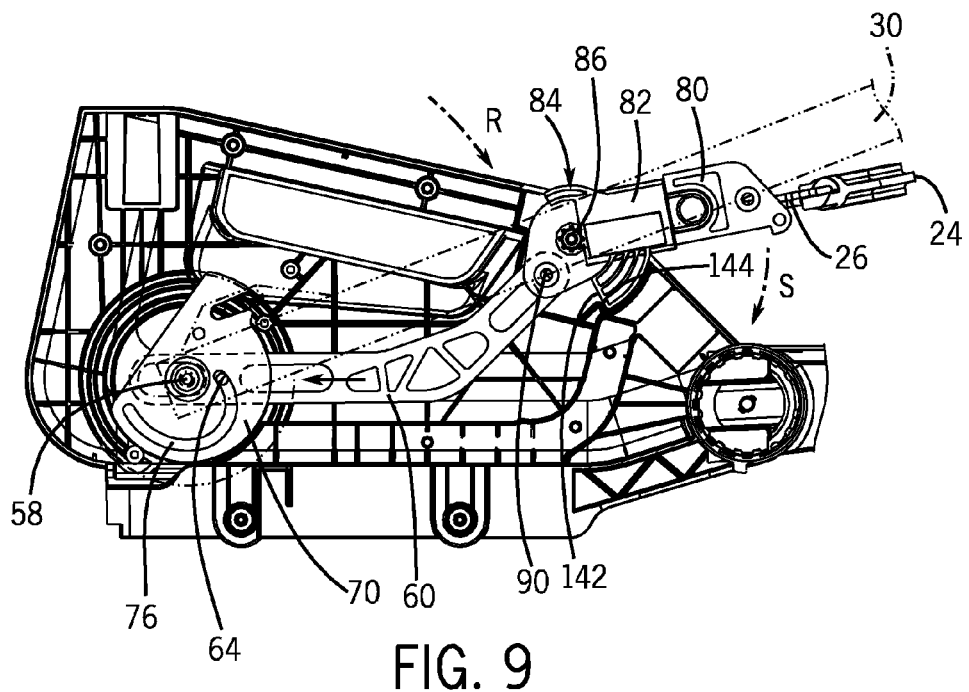
FIG. 9 shows the seat assembly in FIG. 8, but with the seat back in the fully folded orientation and the arm bar in the fully stowed position of FIG. 3.

FIG. 9 shows the seat back 30 in the fully folded orientation of FIG. 3 and the arm bar 24 in the fully stowed position. In this configuration, the drive pin 64 is seated at the upper extremity of the drive slot 76. Likewise, the pivot shaft 58 is seated at the opposite inner-most end of the link slot 62. The link slot 62 has a length sufficient to allow maximum necessary travel of the drive link 60. When the recline actuator 126 is actuated, the recline stud 128 is pulled upward toward the upper end of the seat back 30. When the recline actuator 126 is released, a biasing spring (not shown) of the recline actuator or its cables (not shown) will return the recline stud 128 to its lower position. When the seat back 30 is in the folded orientation, the recline stud 128 can seat in the full recline notch 108 of the positioning plate 100. The seat back 30 can thus be retained in the folded orientation. When the seat assembly 12 is removed and carried separate from the frame 14, the seat back will remain in the stowed or folded orientation. To unfold the seat back 30, the recline actuator 126 must first be actuated in order to release the recline stud 128 from the notch 108.

When released from the folded orientation, the seat back 30 can be raised or lifted opposite the direction of the arrow R. Raising the seat back 30 will rotate the drive cam 70 and thus the drive slot 76. The drive pin 64 will translate along the slot 76 and push the drive link 60 forward in a direction opposite the arrows on the link in FIGS. 8 and 9. The forward movement of the drive link 60 will push the connector arm 90 of the articulating link 84, which in turn will rotate the articulating link about the link post 86 in a direction opposite the arrow S. Thus, raising the seat back 30 from the folded orientation of FIGS. 3 and 9 toward the upright in-use orientation of FIG. 7 will simultaneously raise the arm bar 24 back toward the in-use position.

The articulating link 84 in one example can include a travel limiter, if desired. In the disclosed example, a stop projection 140 extends radially from the link body. The projection 140 defines a stop surface 142 oriented in a radial direction relative to the pivot opening 88. A barrier surface 144 is provided on a molded formation within the cavity of the armrest support 22. The barrier surface 144 is located at a radial distance from the link post 86 to coincide with the stop surface 142. As shown in FIGS. 8 and 9, the stop surface 142 can be configured to contact the barrier surface 144 when the arm bar 24 reaches the stowed position. The stop surface 142 and barrier surface 144 can be provided and located so as to bear the brunt of any excessive loads placed on the drive cam or other articulating mechanism components, particularly in the event that an excessive load is placed on the seat back 30 or arm bar 24 either when reorienting the seat back 30 or after being folded.

As will be evident to those having ordinary skill in the art, the configuration and construction of the various articulating mechanism components can vary within the spirit and scope of the present invention. The size, shape, configuration, and arrangement of the various components can be altered from the example shown and yet function as intended. In the disclosed example, a lost motion device permits movement of the seat back 30 between the upright orientation and the in-use reclined orientations. The disclosed lost motion device is created in part by the drive link 60 and its connection to the drive cam 70 and cam slot 76. In an alternate example, the lost motion feature can be provided at the other end of the drive link 60, the articulating link 84, and/or the like. In addition, the seat back 30 can be fixed to the drive cam 70 in a variety of ways so that the seat back and drive cam rotate in unison. In the disclosed example, the recline stud 128 is captured in the stud slot 130 at all times, maintaining the fixed rotational connection between the seat back and drive cam.

The lock guard 122 is provided on the interior side of the inner cover panel 52 and is concentric with the pivot shaft 58. The lock guard 122 covers the otherwise exposed recline and fold notches 108, 110, 112, and 114 and the recline stud 128 of the lock mechanism that lock the seat back in a selected orientation. The stud slot 132 in the lock guard 122 captures the recline stud 128 at all times. Thus, the lock guard 122 also rotates in unison with the seat back 30. The recline stud 128 can seat in any one of the notches in the positioning plate 100 when aligned with the appropriate notch. However, the lock guard 122 covers the entirety of the exposed plate 100 and notches 108, 110, 112, and 114, with only the stud slot 132 being open to allow the stud 128 to pass through the guard. As a result, the lock guard 122 creates a barrier to prevent user access to the seat back recline components and to prevent objects or contaminants from getting caught in the recline mechanism of the seat assembly. All of the other articulating mechanism components are housed within the closed cavity of the armrest support 22. It would be difficult for one to access the articulating mechanism or recline components.

Although certain seat assembly and articulating mechanism components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
    a seat assembly with a seat bottom and a seat back that is movable from an upright in-use orientation to a forward folded orientation closer to the seat bottom;
    a structure extending across the seat assembly in the in-use orientation above the seat bottom and in front of the seat back with the structure in a raised in-use position, wherein when the structure is in the raised in-use position, the seat back is in the in-use orientation;
    a drive link having one end coupled to the structure;
    a slot formed in the drive link; and
    a pivot shaft at a lower end of the seat back about which the seat back pivots, the pivot shaft extending through the slot,
    wherein the structure is driven by the drive link from the in-use position to a lowered stowed position closer to the seat bottom when the seat back is moved to the folded forward orientation.

2. A stroller according to claim 1, further comprising a frame movable from an in-use configuration to a folded configuration, wherein the seat assembly is mountable to and removable from the frame, and wherein the seat back is movable between the in-use and folded forward orientations independent of whether the seat assembly is mounted to or removed from the frame.

3. A stroller according to claim 1, wherein the seat back can be reclined rearward from the upright in-use orientation to a fully reclined orientation, and wherein the structure remains in the in-use position with the seat back in the fully reclined orientation.

4. A stroller according to claim 3, wherein the seat back can be reclined to an intermediate reclined orientation between the upright in-use and fully reclined orientations, and wherein the structure remains in the in-use position with the seat back in the intermediate orientation.

5. A stroller according to claim 1, wherein the stroller has an armrest support on each side of the seat assembly, and wherein each armrest support houses an articulating mechanism including one of the drive links that articulate the structure between the in-use and the stowed positions.

6. A stroller according to claim 1, wherein the structure is an arm bar.

7. A stroller according to claim 1, wherein the drive link translates the seat back between the upright in-use and folded forward orientations.

8. A stroller according to claim 1, wherein the seat back has a drive cam fixed to the lower end at each side of the seat back for rotation with the seat back, each drive cam having a curved drive slot.

9. A stroller according to claim 8, wherein the seat back pivots on a pair of the pivot shafts, one each protruding from an armrest support on each side of the seat assembly, and wherein each drive slot is arranged radially outward from an axis of the respective pivot shaft.

10. A stroller according to claim 9, wherein each drive slot is arranged such that the radial distance from the axis is constant from one end to a mid-portion of the drive slot and such that the radial distance from the axis varies from the other end to the mid-portion of the drive slot.

11. A stroller according to claim 8, further comprising two of the drive links wherein each of the drive links is connected at another end to the drive slot and at the one end to the structure.

12. A stroller according to claim 1, further comprising:
an armrest support on each side of the seat assembly, wherein the pivot shaft is coupled to each of the armrest supports;
a recline stud projecting from the lower end of each side of the seat back;
a positioning plate carried on each of the armrest supports and defining a plurality of recline notches arranged radially spaced from and around the respective pivot shaft, the plurality of recline notches including an upright position notch and a folded position notch,
wherein the recline studs seat in the respective upright position notches with the seat back in the upright in-use position and in the respective folded position notches with the seat back in the folded orientation.

13. A stroller according to claim 12, further comprising:
a lock guard positioned between each side of the seat back and the respective positioning plate, the lock guard covering the plurality of recline notches and having stud slot through which the recline stud passes.

14. A stroller according to claim 1, further comprising two of the drive links, one on each lateral side of the seat assembly.

15. A stroller according to claim 14, wherein the structure has two ends, each of the two ends coupled to a respective one of the two drive links.

16. A stroller seat assembly comprising:
a seat bottom having a generally upward facing seat surface;
a seat back having a back support surface, the seat back being pivotable forward from a generally upright in-use orientation to a stowed orientation with the back support surface facing toward the seat surface;
an armrest support positioned on each side of the seat bottom;
a structure having an end at each of the armrest supports, the structure in a raised in-use position extending across the seat assembly in the in-use orientation above the seat bottom and in front of the seat back;
an articulating link pivotally coupled to each armrest support and coupled to a respective end of the structure; and
a drive link on each side of the seat back, each drive link having one end rotationally coupled to a respective articulating link and an opposite end pivotally coupled to the seat back,
wherein the structure is in a raised in-use position when the seat back is in the in-use orientation, and wherein the structure moves toward the seat bottom from the in-use position to a lowered stowed position when the seat back is moved to the stowed orientation.

17. A stroller seat assembly according to claim 16, wherein the structure is an arm bar and each of the ends is connected to a respective one of the articulating links.

18. A stroller seat assembly according to claim 16, wherein the opposite end of each drive link is connected to a corresponding drive cam rotationally fixed to each side of the seat back.

19. A stroller seat assembly according to claim 18, wherein each drive cam has a cam slot that translates the respective drive link to move the structure when the seat back is moved between the upright in-use orientation and the stowed orientation.

20. A stroller seat assembly according to claim 19, wherein the seat back can be moved rearward from the upright in-use orientation to a reclined orientation, and wherein each is configured to not translate the respective drive link so as to not move the structure when the seat back is moved between the upright in-use orientation and the reclined orientation.

* * * * *